US006203459B1

(12) United States Patent
Calendrille, Jr.

(10) Patent No.: US 6,203,459 B1
(45) Date of Patent: *Mar. 20, 2001

(54) BICYCLE DERAILLEUR SYSTEM WITH INTEGRAL FLEXIBLE SEAL TO PROTECT MOVING PARTS FROM CONTAMINANTS

(76) Inventor: John L. Calendrille, Jr., 11 Keswick La., Plainview, NY (US) 11803

(*) Notice: Subject to any disclaimer, the term of this patent is extended or adjusted under 35 U.S.C. 154(b) by 0 days.

This patent is subject to a terminal disclaimer.

(21) Appl. No.: 09/325,179

(22) Filed: Jun. 3, 1999

Related U.S. Application Data (63) Continuation-in-part of application No. 08/900,754, filed on Jul. 25, 1997, now Pat. No. 5,924,946.

(51) Int. Cl.[7] .............................. F16H 9/00; F16C 1/26; F16J 15/50
(52) U.S. Cl. ........................ 474/82; 474/144; 474/80; 464/172; 464/175; 74/18.1
(58) Field of Search ..................... 474/82, 80, 56, 474/69, 83, 92, 144–146; 74/512, 608, 18.1; 464/172, 173, 175

(56) References Cited

U.S. PATENT DOCUMENTS

| | | |
|---|---|---|
| 947,651 | 1/1910 | Schreiber . |
| 2,773,398 | 12/1956 | Swain . |
| 3,184,993 | 5/1965 | Swenson . |
| 3,896,679 | 7/1975 | Huret et al. . |
| 3,903,751 | 9/1975 | Dian . |
| 3,910,136 | 10/1975 | Juy . |
| 3,973,447 | 8/1976 | Nagano . |
| 4,237,743 | 12/1980 | Nagano . |
| 4,276,786 | 7/1981 | Langenstein . |
| 4,443,207 * | 4/1984 | Buthe et al. ........................ 464/175 |
| 4,471,851 | 9/1984 | Kamiya et al. . |
| 4,507,105 | 3/1985 | Stottmann et al. . |
| 4,515,386 | 5/1985 | Tsujimura . |
| 4,573,950 | 3/1986 | Nagano . |
| 4,581,265 | 4/1986 | Follette . |
| 4,632,416 * | 12/1986 | Zelenetz ........................ 474/246 X |

(List continued on next page.)

FOREIGN PATENT DOCUMENTS

| | | |
|---|---|---|
| 3518798 | 11/1985 | (DE) . |
| 6-144341 | 5/1994 | (JP) . |

OTHER PUBLICATIONS

Mavic, News 94, Advertising Brochure (undated).
Sachs Catalog (4 pages) (date unknown).

*Primary Examiner*—David A. Bucci
*Assistant Examiner*—Marcus Charles
(74) *Attorney, Agent, or Firm*—Richard M. Goldberg (57) ABSTRACT

A combination includes a derailleur having a chain cage engaging a bicycle chain, a clamping head clamping the derailleur to a bicycle frame and including an opening therethrough, a controller actuating the chain cage and including link arms pivotally connected at one end to the clamping head, with the cable extending through the opening in the clamping head and to the upper link arm, and a cage securing member connected with the chain cage, with opposite ends of the link arms pivotally connected to the cage securing member; and a one-piece protective cover including an endless sleeve of a rubber material, having a hollow interior, a first open end, having a first axis, in communication with the hollow interior and of sufficient size to permit the first open end to be pulled over the clamping head and the controller, the first open end being secured to the cage securing member, a second opposite open end, having a second central axis perpendicular to the first central axis, and in communication with the hollow interior, the second open end being of sufficient size to permit the second open end to be pulled over the clamping head, the second open end being secured to the clamping head, and a section of the sleeve which is adapted to cover the controller and which extends between the first and second open ends, has a bellows configuration.

17 Claims, 6 Drawing Sheets

U.S. PATENT DOCUMENTS

| | | |
|---|---|---|
| 4,813,913 | 3/1989 | Belter . |
| 4,905,541 | 3/1990 | Alan . |
| 4,954,121 * | 9/1990 | Juy ......................................... 474/82 |
| 5,104,358 | 4/1992 | Kobayashi . |
| 5,326,331 | 7/1994 | Hallock, III . |
| 5,397,273 | 3/1995 | Ando . |
| 5,494,307 * | 2/1996 | Anderson ........................... 474/80 X |
| 5,540,118 * | 7/1996 | Calendrille, Jr. ................. 474/144 X |
| 5,616,854 * | 4/1997 | Berg ..................................... 73/49.1 |
| 5,676,616 | 10/1997 | Hara . |
| 5,924,946 * | 7/1999 | Calendrille, Jr. ....................... 474/82 |

* cited by examiner

BICYCLE DERAILLEUR SYSTEM WITH INTEGRAL FLEXIBLE SEAL TO PROTECT MOVING PARTS FROM CONTAMINANTS

REFERENCE TO RELATED APPLICATION

The present invention is a continuation-in-part of U.S. patent application Ser. No. 08/900,754, filed Jul. 25, 1997, which issued into U.S. Pat. No. 5,924,946 on Jul. 20, 1999, by John L. Calendrille, Jr., and entitled BICYCLE DERAILLEUR SYSTEM WITH INTEGRAL FLEXIBLE SEAL TO PROTECT MOVING PARTS FROM CONTAMINANTS, INCLUDING CABLE SEAL TO PREVENT CONTAMINANTS FROM ENTERING CABLE HOUSING.

BACKGROUND OF THE INVENTION

The present invention relates generally to bicycle derailleurs, and more particularly, is directed to flexible covers for bicycle derailleurs to protect the same from contaminants such as mud.

In order to provide different gear ratios during pedaling, a plurality or different sized chain sprockets are mounted for rotation along the axes of the rear hub and the pedal shaft of the bicycle. Typically, there are two or three different sized chain sprockets, known as chain rings, rotatable along the axis of the pedal shaft, and six or seven different sized chain sprockets, known as freewheel cogs, mounted in spaced relation on a free wheel and rotatable along the axis of the rear hub. The number of available gear ratios increases with the number of chain rings and cogs that are provided. The cogs (and chain rings) are spaced apart from each other, with the largest diameter ones to the inside (or outside) and the others decreasing in diameter toward the outside (or inside).

Because there are a plurality of different sized freewheel cogs associated with the rear wheel hub and a plurality of chain rings associated with the pedal shaft, it is necessary to move the chain from one freewheel cog to another and/or from one chain ring to another, to change gears. This operation is performed by a front derailleur associated with the chain rings and a rear derailleur associated with the free wheels, and particularly, with the chain at such positions.

A conventional front derailleur includes a clamping assembly which clamps the derailleur to the seat tube of the bicycle, a cage assembly which moves the chain from one chain ring to another, and a controller which connects the cage assembly to the clamping assembly and which, more importantly, controls movement of the cage assembly to control the latter to move the chain from one chain ring to another.

Specifically, the controller includes an upper pivot head fixed to the clamping assembly, and inner and outer spaced apart pivot bars, each pivotally connected at its upper end to the upper pivot head. The lower end of the inner pivot bar is pivotally connected with the inner cage plate of the cage assembly, and the lower end of the outer pivot bar is pivotally connected with a cross bar of the cage assembly. A return spring is provided around the lower pivot pin of the inner pivot bar to normally bias the cage assembly inwardly of the bicycle. Further, a pivot bar extension extends from the pivoted end of the inner or outer pivot bar, and a cable is secured thereto. The cable extends to a gear shift lever on the bicycle. When the cable is pulled, the pivot bars pivot outwardly against the force of the return spring so as to move the cage assembly outwardly in order to move the chain. The cable can be connected to the extension from below, in which case the derailleur is a bottom pull front derailleur and the pivot bar extension extends from the pivoted end of the outer pivot bar, or from above, in which case the derailleur is a top pull front derailleur and the pivot bar extension extends from the pivoted end of the inner pivot bar.

A conventional rear derailleur includes a clamping assembly which secures the rear derailleur to a rear drop-out or rear axle holder of the frame of the bicycle, a chain cage which moves the chain from one cog to another, and a controller which connects the chain cage to the clamping assembly and which, more importantly, actuates the chain cage to control the latter to move the chain from one cog to another.

Specifically, the clamping assembly includes a clamping head through which a bolt extends for securing the rear derailleur to a rear drop-out or rear axle holder of the frame.

The chain cage includes two parallel, spaced apart cage plates. The inner and outer cage plates are connected together at the proximal end by a pivot shaft having a jockey pulley rotatably mounted thereon between the cage plates, and are connected together at the distal end by a pivot shaft having an idler pulley rotatably mounted thereon between the cage plates.

The controller includes an upper pivot head having the clamping head formed as an integral extension thereof. Inner and outer spaced apart pivot bars are pivotally connected at their upper ends by pivot pins to the upper pivot head. The lower ends of the inner and outer pivot bars are pivotally connected by pivot pins to an inwardly extending lower pivot head, and a spring is provided about a lower pivot pin to normally bias the lower pivot head outwardly of the bicycle relative to upper pivot head. The lower pivot head is fixed to the proximal end of the outer cage plate.

Further, a pivot bar extension extends inwardly from a midpoint of the outer pivot bar, and a cable is secured thereto by a cable anchor bolt thereof. The cable extends upwardly through a guide bore as an extension of the upper pivot head, to a gear shift lever on the bicycle.

When the cable is pulled up, the pivot bars pivot inwardly against the force of the return spring so as to move the chain cage inwardly of the bicycle, thereby moving the chain from one cog to another, However, a problem that occurs in many situations, and particularly when racing bicycles in muddy conditions, is that mud and other grit cakes onto the controller of the front and/or rear derailleur. Another problem is in cold conditions where water freezes onto the controller. As a result, the moving parts of the controller may become inoperable or damaged, or at least, the performance may be severely degraded. The moving parts include the pivot bars, pivot or bearing assemblies which pivotally mount the pivot bars, and the return spring. Further, even if the controller is operable, it may wear faster, requiring more frequent replacement. This is because the mud and grit act like sandpaper and cut into the bearing surfaces, causing premature wear which translates into play or slop in the mechanism. Still further, because of such mud and other grit, it is necessary to constantly clean the derailleurs, which is time consuming and burdensome.

Although various rear derailleur guards are known which are positioned to the outside of the outer cage plate to protect the cage plates of a rear derailleur from impact, such as disclosed in U.S. Pat. No. 3,184,993 to Swenson and U.S. Pat. No. 4,905,541 to Alan, these guards do nothing to prevent mud and other grit from clogging operation of the derailleur controller. Further, bicycle chain guards which protect the chain are known from U.S. Pat. No. 4,507,105 to Stottmann et al.

Various boots are known for machinery parts, such as U.S. Pat. No. 4,276,786 to Langenstein with respect to earth moving vehicles; U.S. Pat. No. 4,581,265 to Follette and U.S. Pat. No. 4,813,913 to Belter. None of the boots in these patents are used for bicycle derailleurs and they are therefore configured very differently.

U.S. Pat. No. 5,540,118 to the same applicant herein, the entire disclosure of which is incorporated herein by reference, discloses a flexible rubber cover for a bicycle derailleur which protects the moving parts of the controller against contaminants, such as mud, dirt, ice and the like. However, the cover is formed with two side edges which must be secured around the controller. As a result, there is still the possibility that dirt, water and the like can enter into the controller. Further, assembly can be burdensome, since the opposite side edges must be secured together around the controller.

Parent U.S. patent application Ser. No. 08/900,754, the entire disclosure of which is incorporated herein by reference, provides a solution to this problem by providing a bicycle derailleur system that substantially prevents the deposit of mud and other grit onto the controller of the derailleur, prevents water from freezing on the controller of the derailleur, inhibits premature wear of the controller of the derailleur, and maintains the controller in a substantially clean condition at all times. This is accomplished with a cover in the form of a sleeve that can be easily and quickly slipped over the controller of the derailleur. However, the lower outer surface of the parallelepiped section of the sleeve is formed with a small nipple which is generally in axially, but offset, alignment with the axis of the inturned circular lip of the sleeve, in order to receive the cable therein. The nipple is formed near an edge of the outer surface of the parallelepiped section. Thus, when the cover is assembled on the derailleur, the nipple covers the cable guide tube. This, however, makes the construction of the cover more complicated and costly, and can make the assembly thereof burdensome and difficult.

Lastly, a rear derailleur is known which is sold by Sachs under the trademarks "PLASMA" and "CENTERA" in which the cable extends through the clamping assembly and has its free end secured to the lower link of the controller. However, there is no protective boot or cover for this derailleur.

OBJECTS AND SUMMARY OF THE INVENTION

Accordingly, it is an object of the present invention to provide a flexible bicycle derailleur cover that overcomes the problems with the aforementioned prior art.

It is another object of the present invention to provide a bicycle derailleur system that substantially prevents the deposit of mud and other grit onto the controller of the derailleur, and prevents water from freezing on the controller of the derailleur.

It is still another object of the present invention to provide a bicycle derailleur system that inhibits premature wear of the controller of the derailleur.

It is yet another object of the present invention to provide a bicycle derailleur system cover that maintains the controller in a substantially clean condition at all times.

It is a further object of the present invention to provide a bicycle derailleur system having a cover in the form of a sleeve that can be easily and quickly slipped over the controller of the derailleur.

It is a still further object of the present invention to provide such a bicycle derailleur system which eliminates the need for a nipple on the cover for the cable and provides a more direct connection of the cable.

In accordance with an aspect of the present invention, a one-piece protective cover is provided for a derailleur of a bicycle including a frame. The derailleur is mounted to the frame and includes a cage, a controller for actuating the cage to control movement of the cage and a derailleur clamping head for clamping the derailleur to the bicycle frame, with a device being connected to the controller of the derailleur for actuating the controller. The one-piece protective cover includes an endless sleeve with a hollow interior, the sleeve being made of a flexible, resilient material. A first open end is provided at one end of the sleeve and in communication with the hollow interior, the first open end being of sufficient size to permit the first open end to be pulled over the derailleur clamping head and the controller, the first open end having a first central axis. A second open end is provided at an opposite end of the sleeve and in communication with the hollow interior, the second open end being of sufficient size to permit the second open end to be pulled over the derailleur clamping head, the second open end having a second central axis which is out of alignment with the first central axis. Further, there is at least a section of the sleeve which is adapted to cover the controller and which extends between the first and second open ends, having a bellows configuration.

The first and second central axes are generally perpendicular to each other, and in such case, the derailleur is a rear derailleur.

The sleeve further includes a generally parallelepiped section contiguous with the bellows section and in open communication therewith, with the second open end being formed in the parallelepiped section and the first open end being formed in the bellows section.

The first open end includes a first inturned lip for engaging within a first recessed section of the derailleur, and the second open end includes a second inturned lip for engaging within a second recessed section of the derailleur. Preferably, the first and second inturned lips are circular and extend around the entire first and second open ends, respectively.

The flexible, resilient material includes a rubber material.

In accordance with another aspect of the present invention, a combination of a derailleur mountable to a frame of a bicycle having a device for actuating the derailleur, and a one-piece protective cover for the derailleur is provided. The combination includes a derailleur having a chain cage for engaging a chain of the bicycle, a derailleur clamping head for clamping the derailleur to the bicycle frame, the derailleur clamping head including an opening extending therethrough for receiving the device for actuating therethrough, and a controller for actuating the chain cage to control movement of the chain cage. The controller includes a cage securing member connected with the chain cage. The one-piece protective cover includes an endless sleeve having a hollow interior, the sleeve being made of a flexible, resilient material. A first open end is provided at one end of the sleeve in communication with the hollow interior, the first open end being of sufficient size to permit the first open end to be pulled over the clamping derailleur head and the controller, the first open end being secured to the cage securing member, and the first open end having a first central axis. A second open end is provided at an opposite end of the sleeve and in communication with the hollow interior, the second open end being of sufficient size to permit the second open end to be pulled over the derailleur clamping head, the second open end being secured to the derailleur clamping head, and the second open end having a second central axis which is out of alignment with the first central axis. At least a section of the sleeve which is adapted to cover the controller and which extends between the first and second open ends, has a bellows configuration.

The controller further includes an upper link arm and a lower link arm, each pivotally connected at one end to the derailleur clamping head, with the device for actuating being connected through the opening in the derailleur clamping head and to the upper link arm for actuating the controller, with opposite ends of the link arms pivotally connected to the cage securing member. In this regard, the upper link arm includes an arm extension and the device for actuating is connected to the arm extension.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
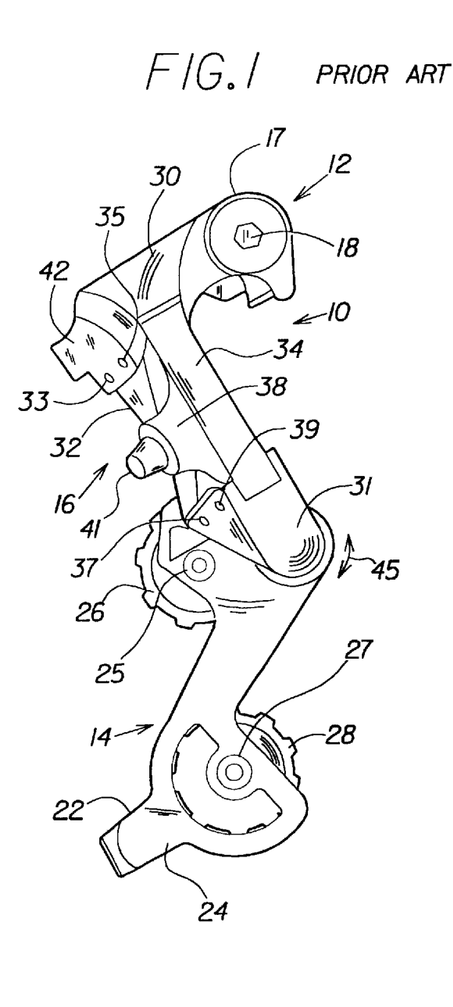
FIG. 1 is perspective view of a conventional rear derailleur.

Referring first to FIG. 1, a conventional rear derailleur 10 for a bicycle is shown. Specifically, rear derailleur 10 includes a clamping assembly 12 which secures rear derailleur 10 to a rear drop-out or rear axle holder (not shown) of the frame of the bicycle, a chain cage 14 which moves the chain from one cog to another, and a controller 16 which connects chain cage 14 to clamping assembly 12 and which, more importantly, actuates chain cage 14 to control the latter to move the chain from one cog to another.

Specifically, clamping assembly 12 includes a clamping head 17 through which a bolt 18 extends for securing rear derailleur 10 to a rear drop-out or rear axle holder of the frame.

Chain cage 14 includes inner and outer parallel, spaced apart cage plates 22 and 24. Inner and outer cage plates 22 and 24 are connected together at the proximal end by a pivot shaft 25 having a jockey pulley 26 rotatably mounted thereon between cage plates 22 and 24, and are connected together at the distal end by a pivot shaft 27 having an idler pulley 28 rotatably mounted thereon between cage plates 22 and 24.

Controller 16 includes an upper pivot head 30 having clamping head 17 formed as an integral extension thereof. Inner and outer spaced apart pivot bars 32 and 34 are pivotally connected at their upper ends by pivot pins 33 and 35, respectively, to upper pivot head 30. The lower ends of inner and outer pivot bars 32 and 34 are pivotally connected by pivot pins 37 and 39 to a lower pivot head 31, and a spring (not shown) is provided about pivot pin 37 to normally bias lower pivot head 31 outwardly of the bicycle relative to upper pivot head 30. Lower pivot head 31 is rotatably secured to the proximal end of outer cage plate 24 so as to be capable of rotation in the direction of arrow 45.

Further, a pivot bar extension 38 extends inwardly from a midpoint of outer pivot bar 34, and a cable (not shown) is secured thereto by a cable anchor bolt 41 thereat. The cable extends upwardly through a guide bore 42 as an extension of upper pivot head 30, to a gear shift lever (not shown) on the bicycle.

When the cable is pulled up, pivot bars 32 and 34 pivot inwardly against the force of the return spring so as to move chain cage 14 inwardly of the bicycle, thereby moving the chain from one cog to another.

As discussed above, a problem that occurs in many situations, and particularly when racing bicycles in muddy conditions, is that mud and other grit cake onto controller 16. As a result, the moving parts of controller 16, such as pivot bars 32 and 34, pivot pins 33, 35, 37 and 39, the return spring (not shown) and the pivoting connection of lower pivot head 31 to outer cage plate 24, may become inoperable or damaged. Further, even if controller 16 is operable, it may wear faster, requiring more frequent replacement. Still further, because of such mud and other grit, it is necessary to constantly clean derailleur 10, which is time-consuming and burdensome.

In order to overcome this problem, U.S. Pat. No. 5,540, 118 to the same applicant herein, and the entire disclosure of which is incorporated herein by reference, discloses a flexible bicycle derailleur cover or boot for use with rear derailleur 10. However, this cover requires opposite ends to be secured together by the user about controller 16, which can become burdensome. Further, the cover is formed with two side edges which must be secured around the controller. As a result, there is still the possibility that dirt, water and the like can enter into the controller.

Parent U.S. patent application Ser. No. 08/900,754, the entire disclosure of which is incorporated herein by reference, provides a solution to this problem by providing a bicycle derailleur system that substantially prevents the deposit of mud and other grit onto the controller of the derailleur, prevents water from freezing on the controller of the derailleur, inhibits premature wear of the controller of the derailleur, and maintains the controller in a substantially clean condition at all times. This is accomplished with a cover in the form of a sleeve that can be easily and quickly slipped over the controller of the derailleur. However, the lower outer surface of the parallelepiped section of the sleeve is formed with a small nipple which is generally in axially, but offset, alignment with the axis of the inturned circular lip of the sleeve, in order to receive the cable therein. The nipple is formed near an edge of the outer surface of the parallelepiped section. Thus, when the cover is assembled on the derailleur, the nipple covers the cable guide tube. This, however, makes the construction of the cover more complicated and costly, and can make the assembly thereof burdensome and difficult.

The present invention provides a novel derailleur cover that overcomes these problems.

Figure 2:
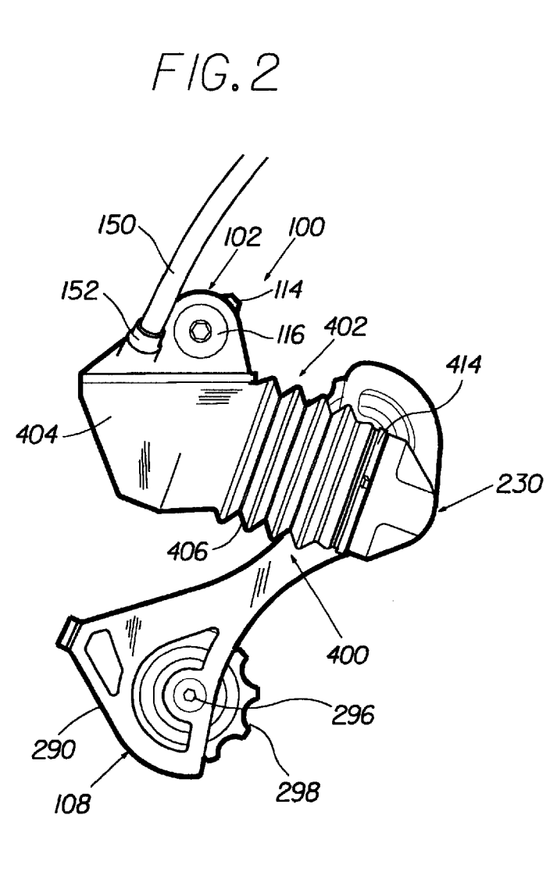
FIG. 2 is a perspective view of a combined rear derailleur and flexible cover therefor according to the present invention.

As shown in FIG. 2, the present invention is directed to a novel combination of an assembled derailleur 100 and a derailleur cover or boot 400 therefor. Cover 400 is in the form of a sleeve that is pulled over derailleur 100 and secured thereon, and has a bellows type arrangement to permit movement of the controller.

Figure 3:
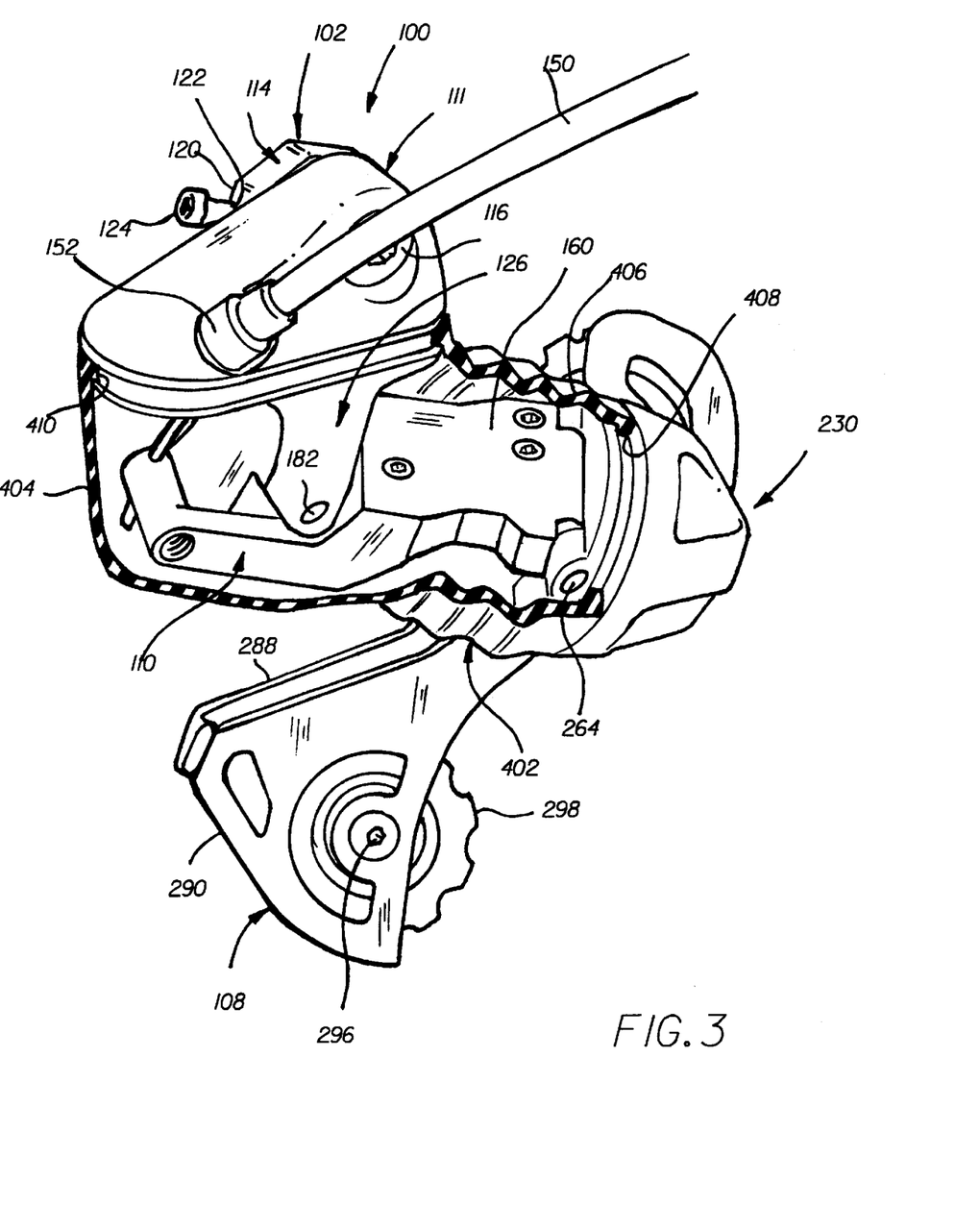
FIG. 3 is a perspective view of the combined rear derailleur and flexible cover of FIG. 2, with the flexible cover being shown in lengthwise cross-section thereof.

Referring to FIGS. 2 and 3, rear derailleur 100 includes a clamping assembly 102 which secures rear derailleur 100 to a rear drop-out or rear axle holder (not shown) of the frame of the bicycle, a chain cage 108 which moves the chain from one cog to another, and a controller 110 which connects chain cage 108 to clamping assembly 102 and which, more importantly, actuates chain cage 108 to control the latter to move the chain from one cog to another.

As shown in FIGS. 4–7, clamping assembly 102 includes a head piece ill with an enlarged bulbous clamping head 112 having a through opening 113 through which a bolt 116 (FIG. 2) extends for securing rear derailleur 100 to a rear drop-out or rear axle holder of the bicycle frame. Clamping assembly 102 further includes a washer 114 (FIG. 2) positioned in an indent 118 at the inner side of clamping head 112, with washer 114 having a central through bore (not shown) which also receives bolt 116 therein. The free end of bolt 116 is pivotally secured to the rear drop-out of the frame, as is conventional, in order to pivotally mount derailleur 100 to the bicycle frame. Washer 114 includes an inward extension 120 which has a threaded bore 122 that receives a head spring bolt 124 (FIG. 2) in order to limit pivoting movement of derailleur 100 by bolt 124 hitting against a portion of the bicycle frame at a certain pivoting angle thereof, as is conventional.

Figures 5, 6:
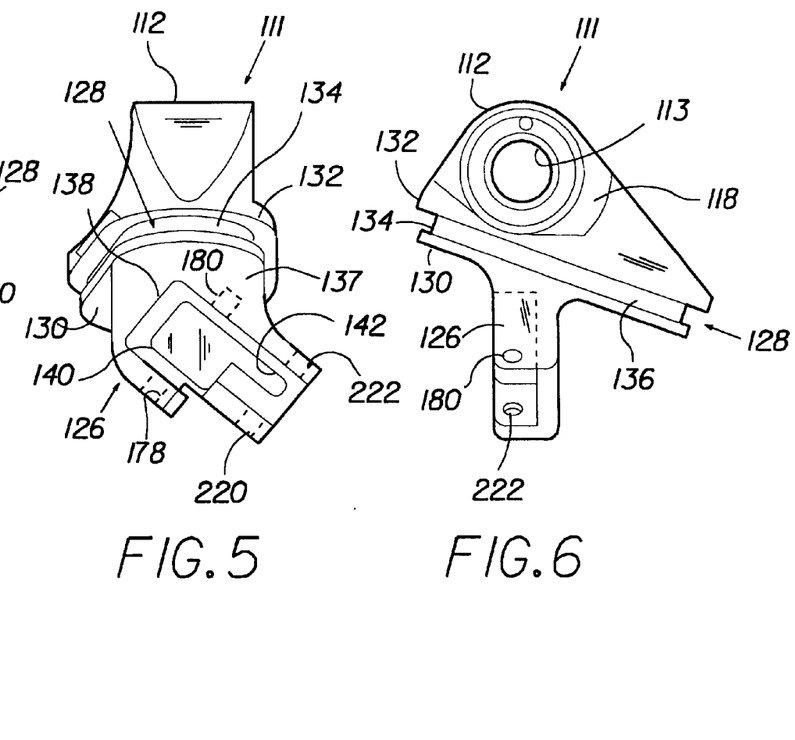
FIG. 5 is a side elevational view of the head piece.
FIG. 6 is a rear elevational view of the head piece.

Head piece 111 further includes an angled extension plate 126 connected to and extending down from bulbous clamping head 112 through a recessed section 128. Angled extension plate 126 extends inwardly relative to the vertical axis of clamping head 112 by an angle of about 50°, as shown in FIG. 5. Recessed section 128 is formed by an oval section 130 at the upper edge of extension plate 126, a lower oval section 132 at the lower edge of bulbous clamping head 112 and having the same general shape as oval section 130 but with slightly greater dimensions, and an oval post 134 connecting together sections 130 and 132 and having the same general shape thereof, but with lesser dimensions than oval section 130. As a result, an oval recess or groove 136 is formed around post 134 and between oval sections 130 and 132. This is an important aspect of the present invention, as will be understood from the discussion which follows. It will further be appreciated that conventional derailleurs do not include any recessed section 128, since there is no reason to do so.

As best shown in FIG. 5, angled extension plate 126 has a forward facing surface 137 with a first inner generally rectangular recess 138 of a first depth extending in the angled direction thereof, and a second generally rectangular recess 140 within recess 138 and extending in the same angled direction, the second recess having a lower recess extension 142. Second recess 140 and lower recess extension 142 have a second depth greater than the first depth of recess 138.

As will be understood from the discussion hereinafter, angled extension plate 126 is adapted to connect the top and bottom link arms of controller 110 with a spring bias thereto.

Figures 4, 7:
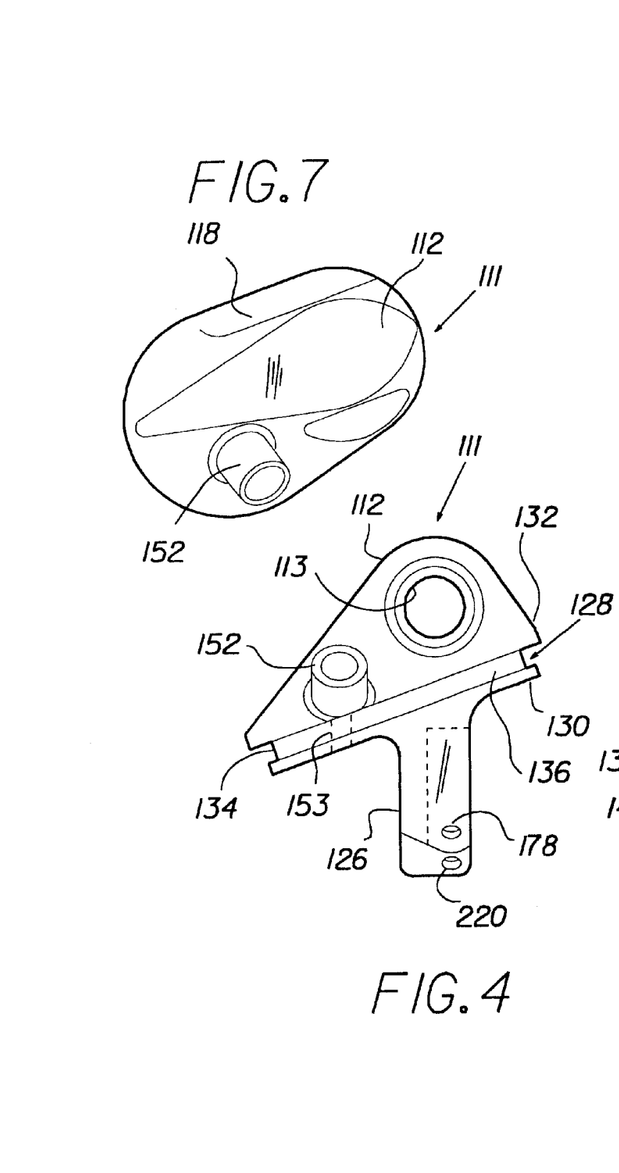
FIG. 4 is a front elevational view of the head piece of the rear derailleur.
FIG. 7 is a top plan view of the head piece.

A laterally extending cable guide tube 152 is formed integrally with and extends outwardly from bulbous clamping head 112, at the front side thereof, as shown best in FIGS. 4 and 7. Thus, a cable 150 extends from the bicycle frame, through cable guide tube 152 and down through an opening 153 exiting the lower surface of bulbous clamping head 112, to controller 110 where it is secured, as will discussed hereinafter. As will be appreciated hereinafter, this arrangement eliminates the requirement for a separate nipple on the cover for the cable 150.

Controller 110 includes a top link arm 160 and a bottom link arm 162.

As shown best in FIGS. 8–11, top link arm 160 includes a generally rectangular plate 164 having a trapezoidal shaped recess 169 at one side thereof which defines a first lateral extension 165a and a second lateral extension 165b on opposite sides of said recess 169. A third lateral extension 166 is also formed at the side of plate 164, which is opposite to second lateral extension 165b. Further, one end of plate 164, adjacent lateral extension 165a, is bifurcated to define two arms 167 and 168 with a space 170 therebetween. In addition, an extension arm 172 extends from the lower surface of first lateral extension 165a, so as to be slightly lower than plate 164 but generally parallel thereto. A transverse tube 173 extends rearwardly from the free end of extension arm 172 and has a threaded bore 188 extending most of the way therethrough. A smaller through bore 184 extends entirely through the rear portion of transverse tube 173 so as to be in open communication with threaded bore 188. Through bore 184 is adapted to receive the free end of cable 150 that exits from opening 153, and a set screw or cable pinch bolt (not shown) threaded within threaded bore 188 is adapted to secure the free end of cable 150 therein.

Through holes 174 and 176 extend through arms 167 and 168, in alignment with each other, and are also in alignment with through hole 178 and blind hole 180 in angled extension plate 126. Thus, when the free ends of arms 166 and 168 are placed within the upper end of first recess 138, a pin 182 (FIG. 3) extends through holes 178, 174, 176 and 180 to pivotally secure top link arm 160 to angled extension plate 126. A transverse through bore 179 is provided at the opposite end of plate 164.

In addition, a threaded opening 192 extends from the upper surface to the lower surface of plate 164, adjacent the connection of arm 167, and receives a spring tension adjust set screw 193 therein. An elongated slot or groove 194 is formed in the lower surface of plate 164, and extends from space 170 inwardly in the lengthwise direction of plate 164, so as to cross threaded opening 192. A coil spring 196 (FIG. 12) is mounted on pin 182 with one end thereof 198 arranged in elongated slot 194, and the opposite end 200 thereof arranged in lower recess extension 142 of angled extension plate 126. Coil spring 196 extends into second recess 140. Accordingly, when top link arm 160 is pivotally mounted to angled extension plate 126, coil spring 196 biases top link arm 160 in the counterclockwise direction of FIG. 3. Spring tension adjust set screw 193 is used to bias the end of coil spring 196 within elongated slot 194, in order to change the biasing force of coil spring 196.

It will be appreciated that, because cable 150 is connected directly through bulbous clamping head 112, into smaller through bore 184, that is, from the top extending downwardly, there is no need for a nipple for the cable in the boot or cover, as will be explained hereinafter, making the construction of the cover simpler and the assembly of the cover on the derailleur simpler.

Further, a threaded opening 202 extends entirely through second lateral extension 166 for receiving a set screw 204 therein, and an adjacent threaded opening 206 extends entirely through plate 164 for receiving a set screw 208 therein. Set screws 204 and 208 are used to control the limits of pivoting of top link arm 160, as will be described hereinafter.

Figures 8, 9, 10, 11, 12, 13, 14, 15:
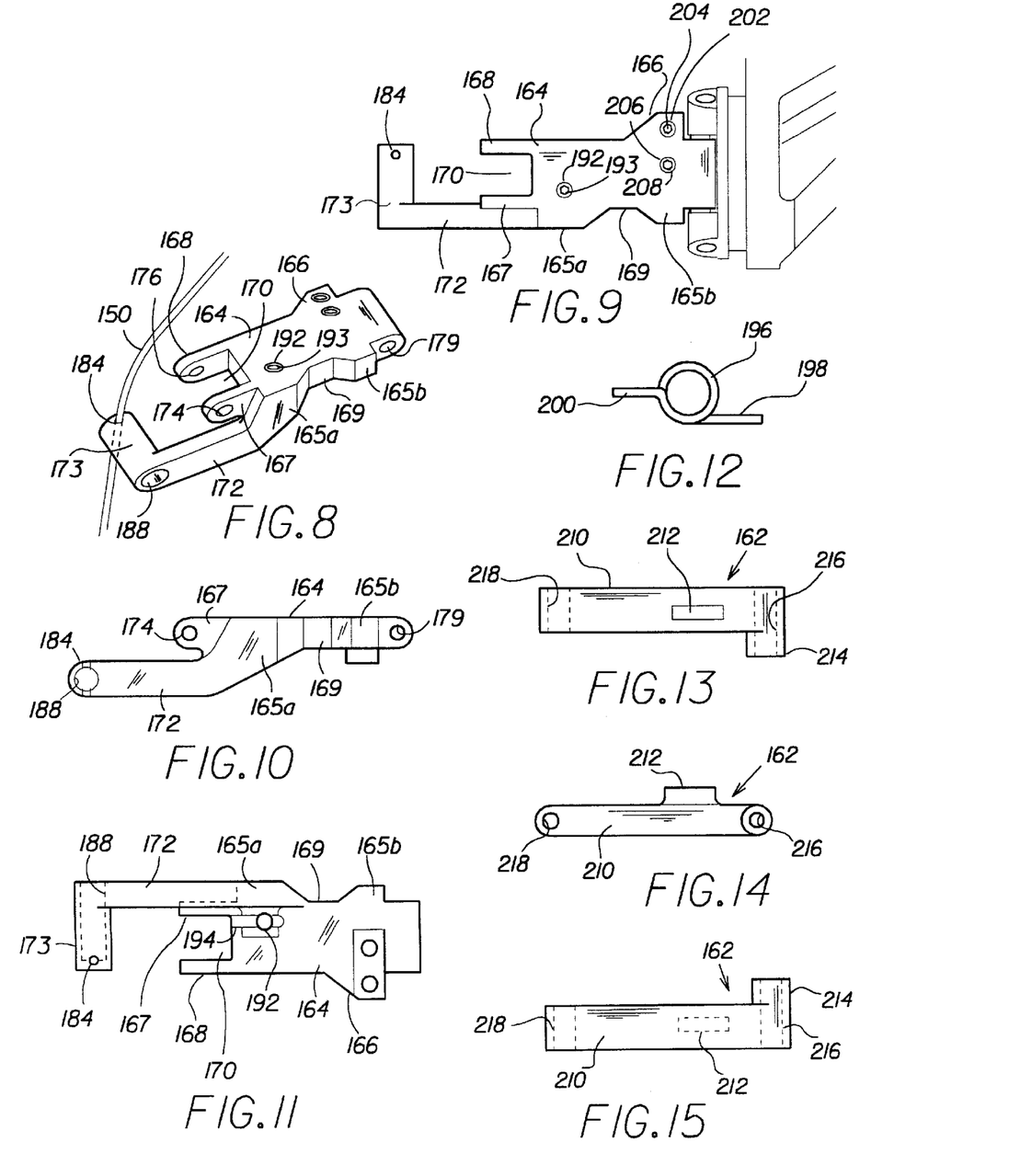
FIG. 8 is a perspective view of the top link arm of the controller of the rear derailleur.
FIG. 9 is a top plan view of the top link arm.
FIG. 10 is a side elevational view of the top link arm.
FIG. 11 is a bottom plan view of the top link arm.
FIG. 12 is a side elevational view of the link arm coil spring.
FIG. 13 is a top plan view of the bottom link arm of the controller of the rear derailleur.
FIG. 14 is a side elevational view of the bottom link arm.
FIG. 15 is a bottom plan view of the bottom link arm.
Figures 16, 17, 18:
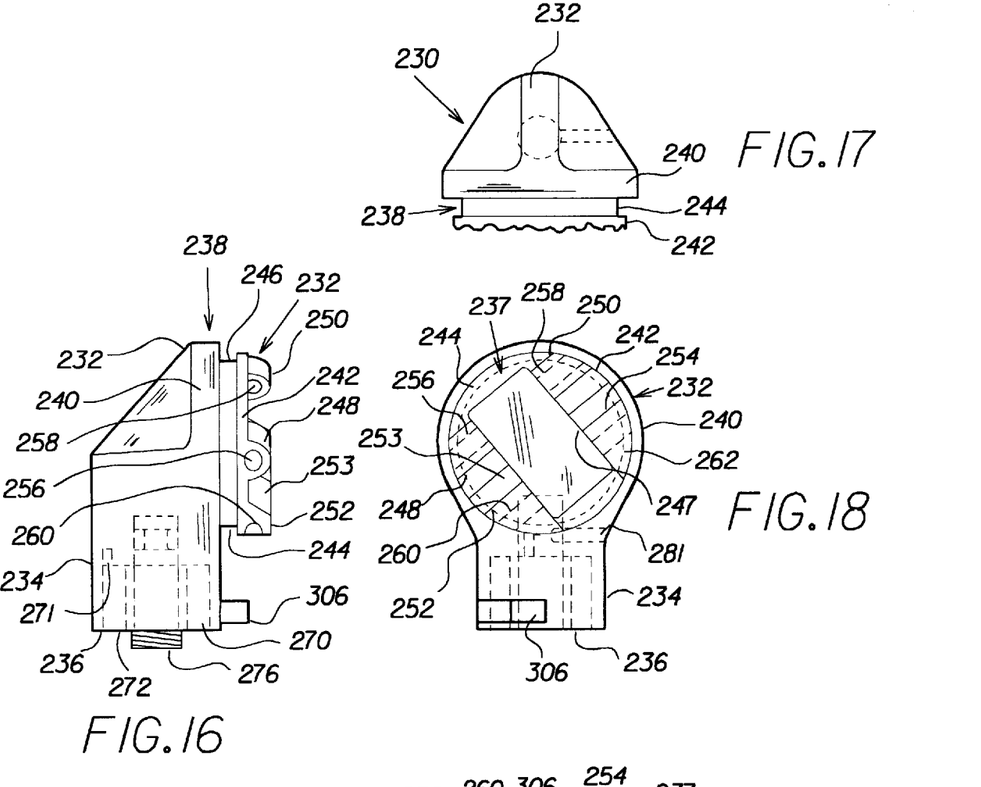
FIG. 16 is a front elevational view of the front knuckle of the rear derailleur.
FIG. 17 is a top plan view of the front knuckle.
FIG. 18 is a side elevational view of the front knuckle.
Figure 19:
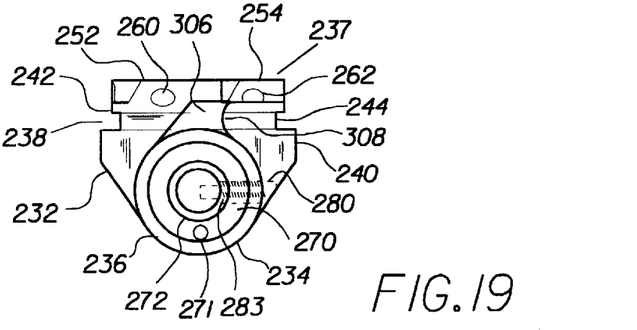
FIG. 19 is a bottom plan view of the front knuckle.
Figure 20:
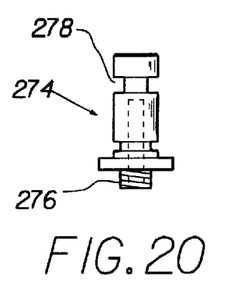
FIG. 20 is a side elevational view of the pivot shaft mounted within the bottom of the front knuckle.
Figure 21:
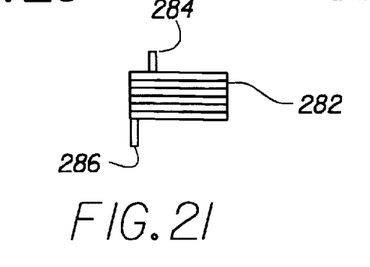
FIG. 21 is a sid e elevational view of the cage coil spring.

As shown in FIGS. 13–15, bottom link arm 162 includes a generally rectangular plate 210 of the same length as top link arm 160. A stop projection 212 extends from the upper surface of plate 210. One end of plate 210 further includes a lateral extension 214. A transverse through bore 216 extends through lateral extension 214 and the respective end of plate 210, while a transverse through bore 218 extends through the opposite end of plate 210.

Transverse through bore 218 is positioned in first recess 138 of angled extension plate 126 below the pivoting connection of top link arm 160, and is in alignment with through holes 220 and 222 in angled extension plate 126. Thus, when the one end of plate 210 is placed within the lower end of first recess 138, a pin (not shown) extends through holes 220, 218 and 222 to pivotally secure bottom link arm 162 to angled extension plate 126.

The opposite ends of top link arm 160 and bottom link arm 162 are pivotally connected to a front knuckle 230 which holds the chain cage 108.

Specifically, as shown best in FIGS. 17–21, front knuckle 230 includes an enlarged head 232 having a lower cylindrical post 234 secured thereto, cylindrical post 234 having a circular lower edge 236. Front knuckle 230 further includes a link arm securing section 237 and a circular recessed section 238 which connects link arm securing section 237 to enlarged head 232.

Circular recessed section 238 is formed by a circular section 240 integral with enlarged head 232, oriented 90° from circular lower edge 236 of lower cylindrical post 234 and having a diameter "D", a circular section 242 integrally formed with link arm securing section 237 and having a diameter "D1" which is slightly less than "D", and a post 244 connecting circular sections 240 and 242 and having a diameter "D2" which is less than both of diameters "D" and "D1". As a result, a circular recess or groove 246 is formed around post 244 and between circular sections 240 and 242. This is an important aspect of the present invention, as will be understood from the discussion which follows. It will further be appreciated that conventional derailleurs do not include any recessed section 238, since there is no reason to do so.

Link arm securing section 237 includes a central rectangular recess 247 (FIG. 18) in the exposed surface of circular section 242, and oriented at an angle of approximately 40° relative to the lengthwise direction of front knuckle 230. Link arm securing section 237 further includes upper bosses 248 and 250, and lower bosses 252 and 254, extending from the exposed surface of circular section 242, on opposite sides of recess 247, with bosses 248, 250, 252 and 254 having transverse through bores 256, 258, 260 and 262 respectively, such that through bores 256 and 258 are in alignment with each other and through bores 260 and 262 are in alignment with each other.

The opposite end of top link arm 160 is positioned in recess 247 between bosses 248 and 250, and a pin 264 (FIG. 3) is positioned through bores 256, 179 and 258 to pivotally secure top link arm 160 thereto. In like manner, the opposite end of bottom link arm 162 is positioned in recess 247 between bosses 252 and 254, and a pin (not shown) is positioned through bores 260, 216 and 262 to pivotally secure bottom link arm 162 thereto.

With this arrangement, coil spring 196 biases top link arm 160, and thereby bottom link arm 162, in the counterclockwise direction of FIG. 3, which results in chain cage 108 being forced upwardly and outwardly. In order to limit the extent of counterclockwise movement, set screw 204 in threaded opening 202 of second lateral extension 166 can be adjusted so as to extend through the lower end of threaded opening 202 and abut against the inclined surface 253 of lower boss 252.

In order to limit clockwise movement of link arms 160 and 162 when cable 150 is pulled, the lower surface of plate 164 of top link arm 160 abuts against stop projection 212 of bottom link arm 162. In order to further limit such movement, set screw 208 in threaded opening 206 of plate 164 can be adjusted downwardly so that stop projection 212 instead abuts against the bottom of set screw 208 during such movement.

The lower end of lower cylindrical post 234 is open to define a circular recess 270 therein, with a further small axially extending bore 271 in the upper wall which defines circular recess 270. A further hollow post 272 of lesser diameter is positioned in circular recess 270, and has its lower edge positioned slightly above the lower edge 236 of post 234. A pivot shaft 274 (FIG. 20) is rotatably mounted within hollow post 272, and has a threaded lower end 276, and a circular recess 278 in the upper end thereof. A set screw 280 extends through a threaded opening 281 in post 234 and an aligned threaded opening 283 in hollow post 272, into engagement with recess 278. As a result, pivot shaft 274 can rotate within hollow post 272, but cannot move axially therein. As will be described hereinafter, chain cage 108 is secured to threaded lower end 276 so that it can rotate about the axis thereof relative to post 234.

A coil spring 282 (FIG. 21) is mounted within circular recess 270, with one end 284 of coil spring 282 in axially extending bore 271 and the opposite end 286 of coil spring 282 secured to chain cage 108, so as to normally bias chain cage 108 in the clockwise direction of FIG. 3.

Figure 22:
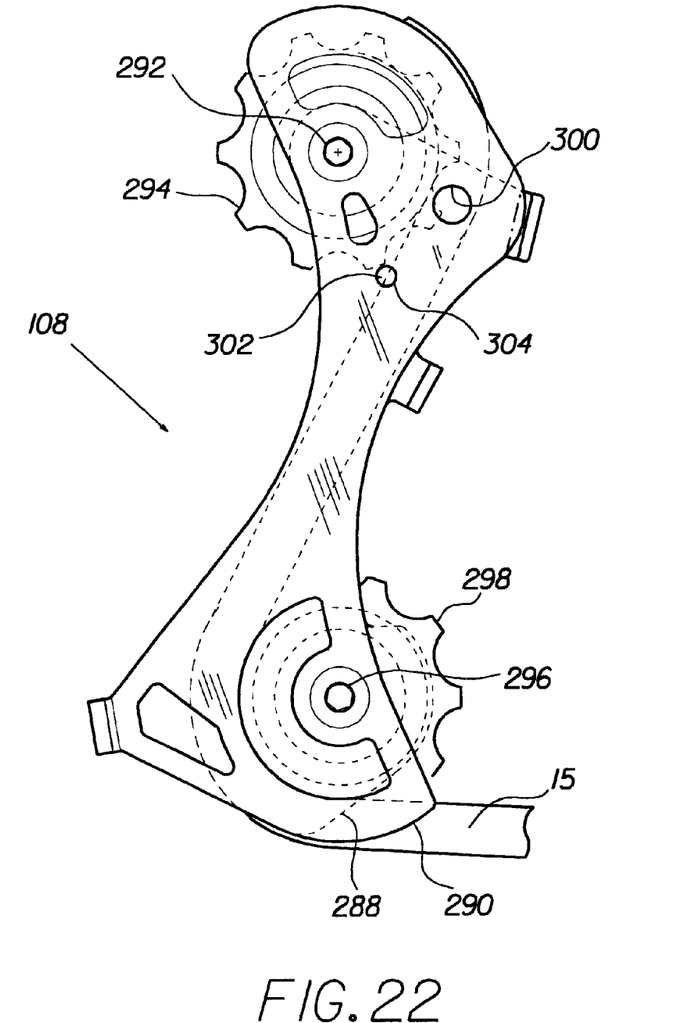
FIG. 22 is a rear elevational view of the cage assembly of the rear derailleur.

As shown in FIGS. 3 and 22, chain cage 108 includes inner and outer parallel, spaced apart, cage plates 288 and 290. Inner and outer cage plates 288 and 290 are connected together at the proximal end by a-pivot bolt 292 having a jockey or upper floating pulley 294 rotatably mounted thereon between cage plates 288 and 290, and are connected together at the distal end by a pivot bolt 296 having an idler or lower pulley 298 rotatably mounted thereon between cage plates 288 and 290.

Outer cage plate 290 includes a threaded opening 300 slightly offset from said pivot shaft 292, and through which the lower threaded end 276 of pivot shaft 274 is mounted. Thus, chain cage 108 is permitted to rotate with pivot shaft 274 relative to the lower edge of front knuckle 230. Normally, coil spring 282 causes rotation of chain cage 108 in the clockwise direction of FIG. 3. In order to set the position thereof, and to limit such rotation, a set screw 302 is received in a threaded opening 304 of outer cage plate 290, and the lower outer cylindrical surface of cylindrical post 234 has an extension 306 thereon, which extends radially outwardly therefrom, and has a free curved surface 308 for engaging with set screw 302.

As discussed above, a problem that occurs in many situations, and particularly when racing bicycles in muddy conditions, is that mud and other grit cake onto controller 110. As a result, the moving parts of controller 110, such as link arms 160 and 162, pivot pins 182 and 264, and coil spring 196 may become inoperable or damaged. Further, even if controller 110 is operable, it may wear faster, requiring more frequent replacement. Still further, because of such mud and other grit, it is necessary to constantly clean derailleur 100, which is time-consuming and burdensome.

As will be described hereinafter in greater detail, controller 110 is wrapped by a cover, boot or sleeve 400, so that controller 110 is covered along all of its sides, its bottom and its top, in order to prevent mud and other grit from entering and fouling controller 110.

Specifically, cover 400 is preferably made of a one-piece neoprene rubber material that can wrap about controller 110, although any other suitable flexible material can be used, such as a sturdy fabric or the like. It is important that cover 400 be flexible so as to permit movement of link arms 160 and 162 when cover 400 is wrapped about controller 110. In other words, it is important that cover 400 be made of a rubber or similar material, so as not to hinder the movement of link arms 160 and 162, and thereby, not affect the operation of the derailleur.

Cover 400 includes a main body sleeve 402 for encasing controller 110 to inhibit entry of contaminants to controller 110, and particularly, to the moving parts thereof. Main body sleeve 402 is made of a flexible, resilient material, such as neoprene rubber, to enable movement of controller 110 and chain cage 108 in their normal operations.

Main body sleeve 402 includes a generally parallelepiped section 404 connected to a bellows section 406. Parallelepiped section 404 is intended to cover angled extension plate 126 with a relatively accurate fit, while bellows section 406 is intended to cover top link arm 160 and bottom link arm 162 of controller 110, while permitting movement thereof due to its bellows configuration. Parallelepiped section 404 and bellows section 406 are both hollow and in open communication with each other so as to define a central passage therethrough.

The free end of bellows section 406 is open, and has an inturned circular lip 408 (FIG. 3) that engages within circular recess 246 of recessed section 238 so as to secure the respective end of cover 400 thereat.

The upper surface of parallelepiped section 404 is formed with an opening which is oriented substantially perpendicular to the open end of bellows section 406, and which has an inturned circular lip 410 (FIG. 4) that engages within circular recess 136 of recessed section 128 so as to secure the respective end of cover 400 thereat.

Accordingly, cover 400 is held in position so as not to move therefrom, by being positioned within recessed sections 128 and 238. Pull ties 414 (FIG. 2) may be provided around the outer surfaces of circular lips 408 and 410 in order to press inturned circular lips 408 and 410 into the respective recessed sections 128 and 238, and thereby further enhance the securement thereat.

As discussed above, in U.S. patent application Ser. No. 08/900,754, there is a small nipple at the lower outer surface of the parallelepiped section 404, which is generally in axially, but offset, alignment with the axis of inturned circular lip 408, in order to receive cable 150 therein. The nipple is formed near an edge of the outer surface of the parallelepiped section. When the cover is assembled on the derailleur, the nipple covers cable guide tube. However, this results in a more complicated structure and makes it more difficult to assemble the cover.

The present invention eliminates this nipple and also provides a more direct connection of the cable.

Accordingly, assembly of cover 400 on derailleur 100 is relatively easy and quick. Specifically, with stop bolt 124, and preferably washer 114, removed, the open end of bellows section 406 is inserted over cable 150 and over clamping head 112 and is then pulled thereover and down over controller 110. Thereafter, the opening in parallelepiped section 404 is pulled completely over clamping head 112 until inturned circular lip 410 thereof seats within circular recess 136 of recessed section 128. In this regard, cover 400 will not move relative to derailleur 100 during use thereof.

At this time, the free end of cable 150 is automatically situated in cover 400, without the use of any nipple. Therefore, the steps of the prior application of pulling the nipple over the cable guide tube of the head piece, pulling bellows section back, threading the cable through the cable guide tube, around the slide block, and then into the cable tunnel for securement, are eliminated.

Then, inturned circular lip 408 seats within circular recess 246 of circular recessed section 238. To further secure cover 400 on derailleur 100, conventional locking tie wraps 414 can be used around the openings in parallelepiped section 404 and bellows section 406 to press inturned circular lips 408 and 410 into their respective circular recesses 136 and 246.

Removal of cover 400 occurs in the reverse order, in order to change cover 400 in the event of damage or wear of the same.

It will therefore be appreciated that flexible bicycle derailleur cover 400 substantially prevents the deposit of mud and other grit onto controller 100 of derailleur 100, and prevents water from freezing on controller 110 of derailleur 100, while also inhibiting premature wear of controller 110. Cover 400 also maintains controller 100 in a substantially clean condition at all times. In addition, assembly thereof is quick and easy, and there is no requirement to secure opposite sides thereof around controller 110 by wrapping, as in U.S. Pat. No. 5,540,118, and no need for detailed threading, etc. of the cable through a nipple.

Figure 23:
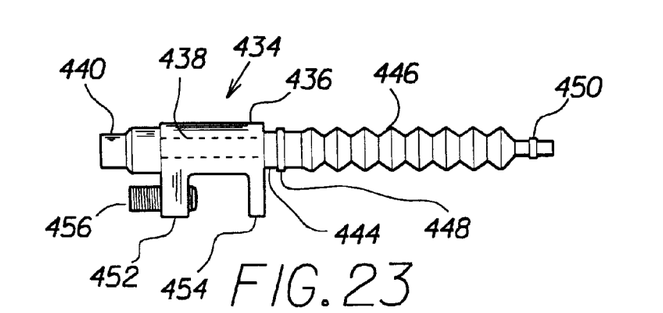
FIG. 23 is a side elevational view of the cable protector assembly.

Referring now to FIG. 23, in order to further protect cable 150 exiting from rear derailleur 100, cable 150 is surrounded by a tubular and flexible cable housing 430. The opposite end of cable housing 430 terminates in an end cap (not shown). However, it is important that no dirt, grit, mud, etc. enter the end cap, since this would result in deterioration of the shifting performance. Therefore, in accordance with another aspect of the present invention, a cable protector 434 is provided to which the end cap is secured, with cable protector 434 being secured to the bicycle frame.

Cable protector 434 includes a generally parallelepiped main body 436 with a through opening 438 therein. One end of main body 436 has a hollow boot 440 secured thereto which is in communication with opening 438. Boot 440 is secured within the end cap by a tie wrap 442, so that the cable 150, as it exits the end cap, enters boot 440 and opening 438 of main body 436. A boot 444 at the opposite end of main body 436 enters an elongated bellows section 446, and is secured thereto by a tie wrap 448. Cable 150 exits from the opposite side of bellows section 446, and bellows section 446 is clamped thereto by at least one and preferably two tie wraps 450. Thus, bellows section 446 permits movement of cable 150, without permitting any dirt, mud, etc. between cable 150 and bellows section 446.

Main body 436 has two downwardly extending flanges 452 and 454 at opposite ends thereof. One flange 452 has a bolt 456 threaded therein so as to be movable toward the other flange 454. A cable stop 458 is secured by welding or the like to the bicycle frame. Thus, cable stop 458 is positioned between flanges 452 and 454, and bolt 456 is tightened to secure main body 436 thereto.

It will therefore be appreciated that a complete system of contaminant prevention is thereby provided by the present invention.

It will further be appreciated-that the present invention is not limited to a rear derailleur, but can also be applied to a top pull front derailleur and a bottom pull front derailleur. In such case, however, as in the aforementioned application, the openings at opposite sides of cover 400 would be at an acute angle relative to each other, rather than the substantially perpendicular angle in the case of the rear derailleur.

It will be appreciated that modifications can be made to the present invention. For example, recessed sections 128 and 238 can be eliminated. In such case, the tie wraps would secure the ends of cover 400 in position.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A one-piece protective cover for a derailleur of a bicycle including a frame, the derailleur being mounted to the frame and including a cage, a controller for actuating the cage to control movement of the cage and a derailleur clamping head for clamping the derailleur to the bicycle frame, with a device being connected to the controller of the derailleur for actuating the controller, said one-piece protective cover comprising:
   an endless sleeve with a hollow interior, said sleeve being made of a flexible, resilient material;
   a first open end at one end of said sleeve and in communication with said hollow interior, said first open end being of sufficient size to permit said first open end to be pulled over said derailleur clamping head and said controller, said first open end having a first central axis;
   a second open end at an opposite end of said sleeve and in communication with said hollow interior, said second open end being of sufficient size to permit said second open end to be pulled over said derailleur clamping head, said second open end having a second central axis which is out of alignment with said first central axis; and
   at least a section of said sleeve which is adapted to cover said controller and which extends between said first and second open ends, having a bellows configuration.

2. A protective cover according to claim 1, wherein said first and second central axes are generally perpendicular to each other.

3. A protective cover according to claim 2, wherein said derailleur is a rear derailleur.

4. A protective cover according to claim 1, wherein said sleeve further includes a generally parallelepiped section contiguous with said bellows section and in open communication therewith, with said second open end being formed in said parallelepiped section and said first open end being formed in said bellows section.

5. A protective cover according to claim 1, wherein said first open end includes a first inturned lip for engaging within a first recessed section of said derailleur, and said second open end includes a second inturned lip for engaging within a second recessed section of said derailleur.

6. A protective cover according to claim 1, wherein said first and second inturned lips are circular and extend around the entire first and second open ends, respectively.

7. A protective cover according to claim 1, wherein said flexible, resilient material includes a rubber material.

8. A combination of a derailleur mountable to a frame of a bicycle having a device for actuating the derailleur, and a one-piece protective cover for the derailleur, said combination of the derailleur and cover comprising:
   a derailleur including:
      a chain cage for engaging a chain of the bicycle,
      a derailleur clamping head for clamping the derailleur to the bicycle frame, the derailleur clamping head including an opening extending therethrough for receiving the device for actuating therethrough, and
      a controller connected between the derailleur clamping head and the chain cage for actuating the chain cage to control movement of the chain cage, said controller including a cage securing member connected with the chain cage; and
   a one-piece protective cover including:
      an endless sleeve having a hollow interior, said sleeve being made of a flexible, resilient material,
      a first open end at one end of said sleeve and in communication with said hollow interior, said first open end being of sufficient size to permit said first open end to be pulled over said derailleur clamping head and said controller, said first open end being secured to said cage securing member, said first open end having a first central axis, and
      a second open end at an opposite end of said sleeve and in communication with said hollow interior, said second open end being of sufficient size to permit said second open end to be pulled over said derailleur clamping head, said second open end being secured to said derailleur clamping head, said second open end having a second central axis which is out of alignment with said first central axis, and
      at least a section of said sleeve which is adapted to cover said controller and which extends between said first and second open ends, having a bellows configuration.

9. A combination according to claim 8, wherein said first and second central axes are generally perpendicular to each other.

10. A combination according to claim 8, wherein said derailleur is a rear derailleur.

11. A combination according to claim 8, wherein said sleeve further includes a generally parallelepiped section contiguous with said bellows section and in open communication therewith, with said second open end being formed in said parallelepiped section and said first open end being formed in said bellows section.

12. A combination according to claim 8, wherein:
   said cage securing member includes a first recessed section;
   said derailleur clamping head includes a second recessed section;
   said first open end includes a first inturned lip for engaging within the first recessed section; and
   said second open end includes a second inturned lip for engaging within the second recessed section.

13. A combination according to claim 8, wherein said first and second inturned lips are circular and extend around the entire first and second open ends, respectively.

14. A combination according to claim 8, further comprising tie wraps for engaging around said first and second open ends in order to tie said first and second open ends to said cage securing member and said derailleur clamping head, respectively.

15. A combination according to claim 8, wherein said flexible, resilient material includes a rubber material.

16. A combination according to claim 8, wherein said controller further includes an upper link arm and a lower link arm, each pivotally connected at one end to the derailleur clamping head, with the device for actuating being connected through the opening in the derailleur clamping head and to the upper link arm for actuating the controller, with opposite ends of the link arms pivotally connected to the cage securing member.

17. A combination according to claim 16, wherein said upper link arm includes an arm extension and the device for actuating is connected to the arm extension.

* * * * *